Aug. 6, 1935.   M. H. LOUGHRIDGE   2,010,027
DIFFERENTIAL LOAD BRAKE
Filed May 11, 1931   2 Sheets-Sheet 1

INVENTOR.

INVENTOR.
Matthew H. Loughridge

Patented Aug. 6, 1935

2,010,027

UNITED STATES PATENT OFFICE 2,010,027

DIFFERENTIAL LOAD BRAKE

Matthew H. Loughridge, Bogota, N. J.

Application May 11, 1931, Serial No. 536,531

56 Claims. (Cl. 188—195)

This invention relates to a braking system of a type in which the braking force may be obtained from the load and its application controlled differentially by the difference in speed between the driving and driven members and is sometimes referred to as the differential load brake, the fundamental principles of which are disclosed in U. S. Patent 1,805,551, issued May 19, 1931. The objects of the present invention are to apply a brake of this class by fluid pressure operated mechanisms, such as hydraulic pressure; to apply a braking system of this kind to a railway truck where the clearances are limited; to apply a braking system of this character in which a plurality of differential mechanisms are used to control the brake; to apply a braking system of this character in which the brakes are released by a plurality of sources of power and are equalized; to apply a braking system of this kind in which the brakes are automatically applied, but may be manually controlled; to apply a braking system to a railway truck which is fully articulated; to apply a braking system of this kind which automatically applies the brakes and may be manually controlled to regulate the extent of the braking application while the brakes are automatically released; to provided a detector on the braking system which prevents motive power being applied to the mechanism when the braking system is out of order. Other objects of the invention will appear from the following specification and the accompanying drawings, in which:

Figure 1:
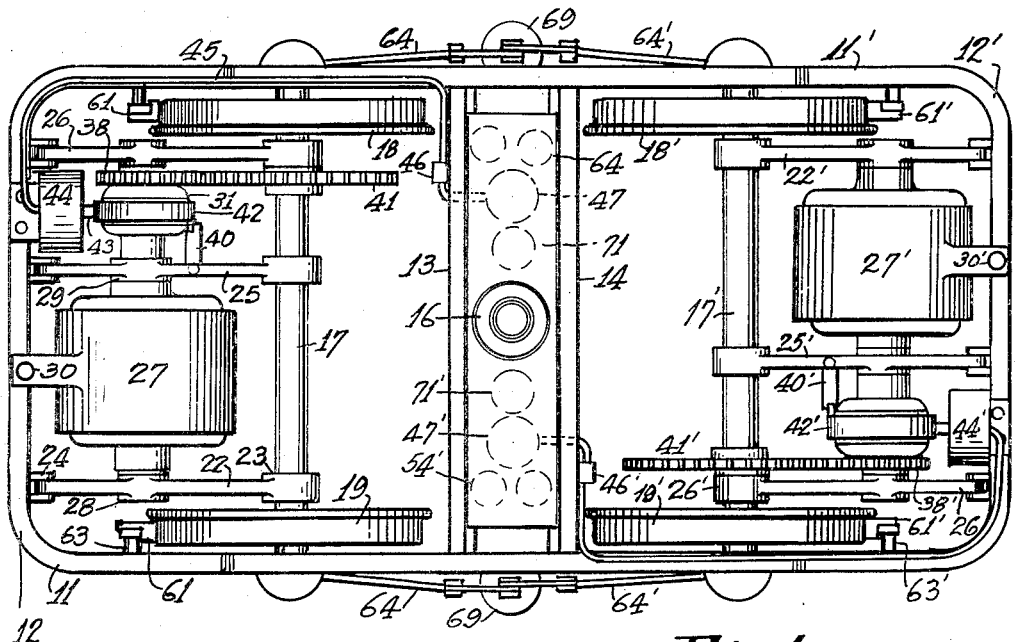
Fig. 1 is a plan view of a common type of railroad truck arranged for electric propulsion by a pair of motors and embodying the braking system of this invention.
Figure 2:
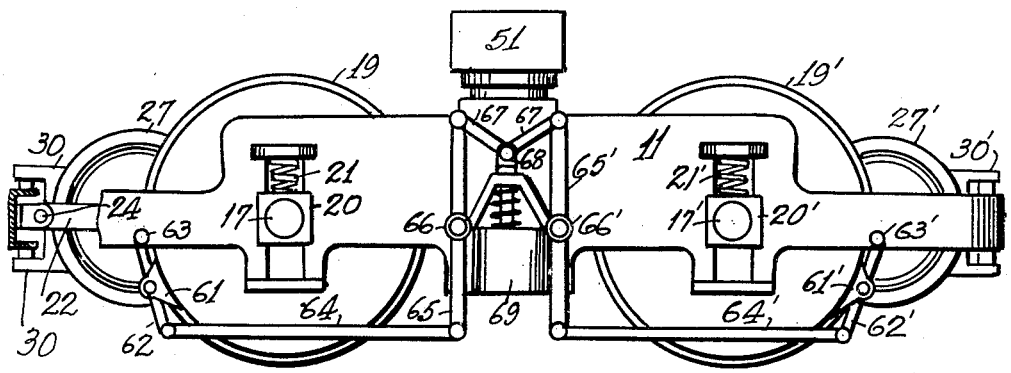
Fig. 2 is a side elevation of the truck shown in Fig. 1 with a portion of the side frame removed to show the interior construction.

In Fig. 1 a railway truck is shown which is fully articulated and which is symmetrical about its transverse and longitudinal axis, the corresponding duplicate parts on the one side of the figure are indicated by reference numbers with a prime mark and operate similarly to the mechanism about to be described.

The side frame of the truck is indicated by 11 and is provided with connecting end bars 12 and also with the transverse center bars 13 and 14 which form guides for the bolster 15 which is provided with a central aperture at 16 for the king pin. The running wheels 18 and 19 are mounted upon the axle 17 and this axle, by the axle boxes 20 and spring 21 supports the frame 11. The bolster 15 is mounted upon a central spring 53 and end springs at 54 and supports the beam 51 of the body which connects with the bolster 15 by the king pin 52. This provides a fully articulated truck and is a typical representation of railway trucks of this character which are completely spring mounted.

A radius arm 22 is pivotally supported at 23 by the axle 17 and is pivotally connected at 24 with the end frame 12. Radius arms 25 and 26 are correspondingly mounted so as to secure freedom of movement of the frame relative to axle 17 on springs 21. The arm 22 has a bearing 28 for the motor 27 and the arm 25 has a corresponding bearing at 29 while the field of the motor is connected by a jaw construction at 30 with a yielding connection to the frame 12.

A differential mechanism 31 connects the spur gear 38 with the motor 27 and gear 38 engages the spur gear 41 mounted upon the axle 17, whereby the motor 27 drives the running wheels 18 and 19 through the differential mechanism 31.

Figures 4, 6, 7, 7A:
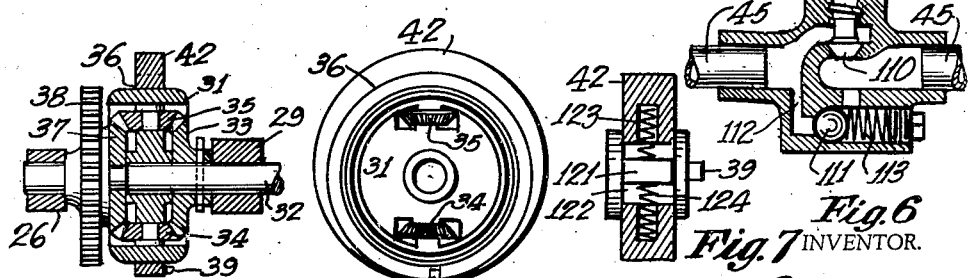
Fig. 4 shows, in section, one form of differential mechanism that may be used in applying this invention.
Fig. 6 is a sectional detail of the control valve.
Fig. 7 is a detail of a spring stop for the differential mechanism.
Fig. 7a, is a side view of the planetary member of the differential mechanism.

Details of the differential mechanism are indicated at Fig. 4 in which 32 is the motor shaft upon which the bevel gear 33 is rigidly mounted and engages bevel gears 34 and 35 mounted on the planetary member 36 which rotates freely on shaft 32. The spur gear 38 is connected integral with the bevel gear 37 engaging the gears 34 and 35 in opposition to gear 33. This construction illustrates the familiar differential gear in which the motor shaft 32 drives the spur gear 38 through the gears 34 and 35 when the planetary member 36 is held stationary and in which there is a difference between the movement of shaft 32 and the gear 38 corresponding to the movement of the planetary member until it is held stationary.

The planetary member 36 is provided with a locking pin 39 which may be constructed as shown in Fig. 7 in which the outer section of the planetary member 42 is provided with a slot 121 for receiving the sliding member 122 engaged by the springs 123 and 124 and carrying the locking pin 39. The object of this construction is to provide a yielding stop for the planetary member so that the starting torque of the truck is applied to the motor by a spring action. The pin 39 engages the stop member 40 secured to the arm 25 so that the planetary member 42 may be limited to one revolution of free movement. The planetary member at 42 is in form of a cam as indicated in Fig. 4 and in Fig. 5, and which engages the stem 43 of a piston 48 operating in a cylinder 44 which connects by pipe 45 with a cylinder 47 having a piston 49 which, through a comparatively stiff spring 50a, engages the lower side of the bolster 15. The pipe 45 is provided with a control valve 46, hereinafter referred to.

Figure 3:
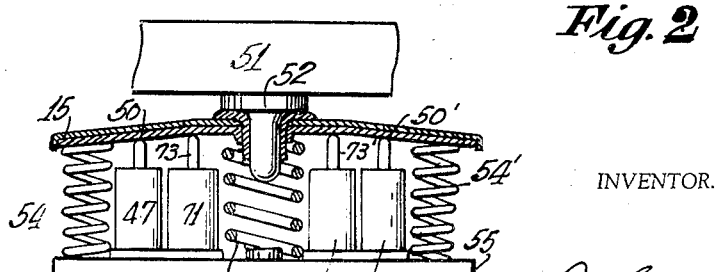
Fig. 3 is a cross section of the bolster of the truck.
Figure 5:
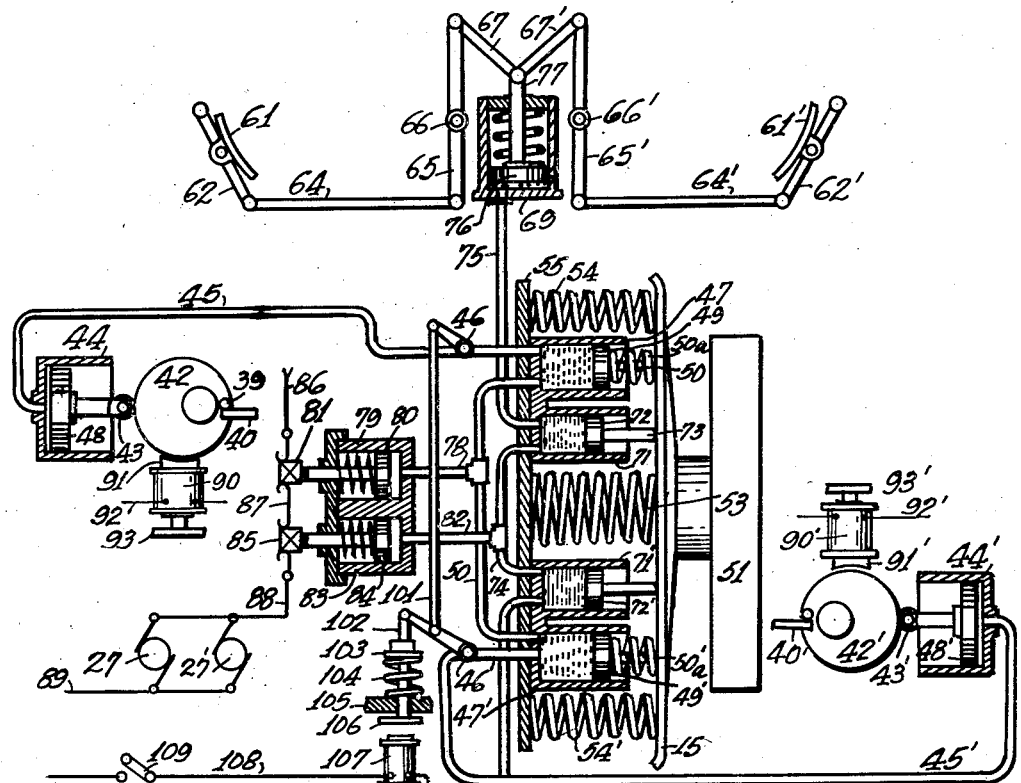
Fig. 5 is an operating diagram of the braking system and the controlling mechanism therefor with a number of the parts shown in section to indicate the operation.

It will be observed, from Figs. 3 and 5, that the cylinder 47 is placed at one end of the bolster and the cylinder 47' is placed at the opposite end of the bolster and that the fluid pressure, in these cylinders, is equalized by the pipe 50b so that the fluid pressure in the cylinder 44 cooperates with the pressure in cylinder 44' to apply pressure for raising the bolster 15 and thereby raising the supported load 51. It should be understood that the term "raising the load" includes supporting the load or part of the load in cooperation with the springs supporting the bolster and it will be noted that the resistance to the pressure in the cylinder 47 and 47' is proportional to the load 51. By this construction, the propulsion motors 27 and 27' operate through the differential mechanism to raise the load at starting until the planetary member 42 has completed its free movement after which the propulsion motors are connected with the gears of the running wheels. In operation, it will be understood, that the starting torque of the motor is applied to raise the load on the bolster through the fluid pressure in the cylinders 44 and 44' and the back pressure from these cylinders tends to retard the movement of the planetary member 42 so that the driving wheels in most cases have started before the planetary member has reached the limit of its movement and in this way the truck is started through a graduated action which enables the truck to be started as the motor is accelerating.

The running wheels are provided with brake shoes 61 mounted on an arm 62 pivoted in the frame at 63 and connected by rod 64 with the lever 65 which is pivoted to the frame at 66. A cylinder 69 is mounted on the frame and has a piston which connects at 68 with the equalizing arms 67—67' so that as the plunger of the piston is moved outwards equalized tension is applied to the brake rods 64—64' with a corresponding pressure on the brake shoes 61—61'. It is usual to mount the brake shoes 61 by a spring mounted on a support which is not shown in the drawings. Below the bolster 15 and at one side is provided the cylinder 71 having a piston 72 with a plunger 73 which engages the bolster. This cylinder is connected by pipe 75 with the brake cylinder 69 which is provided with a piston 76 connected with the plunger 77 which is connected to the equalizing arms 67—67' of the brake levers. On the opposite side of the center another corresponding cylinder 71' is provided which connects with the corresponding brake cylinder 69' on the opposite side of the vehicle, an equalizing connection 74 is provided between the cylinders 71 and 71'. These cylinders are provided with a fluid pressure medium which may be in the form of a gas or liquid and which is arranged to apply pressure to the brake cylinders as the bolster is lowered and to relieve this pressure as the bolster is raised. The cylinders 71—71' are thus arranged with relation to the bolster 15 so that when the cylinders 47—47' are under full pressure, the cylinders 71—71' are relieved of the pressure and, on the other hand, when the supporting pressure in the cylinders 47—47' is reduced, part of the supporting load is then transferred to the pistons 73—73' of the cylinders 71—71', which thereby applies braking pressure to the brake cylinder in proportion to the supported load and in proportion to the extent which the pressure has been relieved in the cylinders 47—47'. The piston 72 may be connected with the bolster 15 by a spring connection similar to the connection of piston 49, if desired.

In this construction it will be observed that any unequal deflection in the bolster is compensated for by the equalizing connections between the cylinder and also any inequality in the pressure fluid, in the cylinders 44—44', such as might arise from difference in the starting speed of the motors is compensated for by the compensating connections between the cylinders.

In the application disclosed, where fluid pressure is relied upon to transmit the braking effects, it is important to insure that this pressure shall always be available and for this purpose a detector is provided on the releasing pressure in the cylinders 47—47' through the cylinder 79 connecting by pipe 78 with the pipe 50b. A piston 80, in this cylinder, is opposed by a stiff spring and on its plunger carries a contact block 81. A similar cylinder 83 is connected by pipe 82 with the equalizing pipe 74 connected to the brake operating cylinders. The piston 84, of this cylinder, is opposed by a stiff spring and carries a contact block 85 on its plunger. The circuit of the propulsion motors may be controlled by these contact blocks as indicated by the circuit on wire 86, contact block 81, wire 87, contact block 85, wire 88 and motors 27—27', and wire 89. When the pressure in these detector cylinders is reduced below the opposing pressure of the spring, the circuit of the motors will be opened at the contact blocks and it will be impossible to operate the vehicle. The contact blocks are so shaped as to hold the circuit closed as the pressure is increased. Thus, as the piston is pressed outwards against the spring by increased pressure in the system, the circuit is maintained by the sliding block 81; but when the pressure is below the normal low limit, or when the fluid has escaped, the block 81 is moved inward to open the circuit controlling the motor. The sliding block 85 operates in a manner similar to the sliding block 81, just described.

It will be observed that the cylinder 79 is connected with the pressure system that controls the brake action, and that cylinder 83 is connected with the pressure system that operates the brakes; the fluids in these systems are independent of each other and the detector system prevents starting the truck except when the operating pressure is maintained in the braking systems.

It will be observed that in the operation of the braking system, as described, the brakes are automatically released by the propulsion motors as long as they are supplied with current and, on the other hand, the brakes are automatically applied as soon as the speed of the propulsion motors becomes less than the corresponding speed of the vehicle so as to move around the planetary member 42 to the position in which the low side of the cam engages the plunger 43. This applies the brakes and maintains them applied until the speed of the motor is again accelerated to exceed the speed of the vehicle thereby causing the rise of cam 42 to engage 43, restoring the pressure in the cylinder 44. In the application of this system to manually controlled vehicles it may be desirable to permit the operator to control the braking effects, as for instance by restricting the extent to which the automatic application of the brakes should be permitted or restricting the extent to which the brakes may be released. For this purpose electric braking is provided for the planetary member 42 as indicated in Fig. 5 in which the brake shoe 91, controlled by the magnet 90 through the armature 93, is applied to retard the movement of 42 when the circuit 92 of the magnet 90 is energized. This provides a remote control of the brakes which can be applied in any position of the planetary member 42. The braking effect in this case is released by opening the circuit of 92 and de-energizing 90 so that the motors may move the planetary member 42 into the released position. This corresponds to magnets 69, 72 in my co-pending application, Serial No. 458,736, filed May 31, 1930.

It is apparent that the extent of the brake application may also be restricted or prevented as, for instance, when leaving a car on a terminal or side track and a braking effect is not desired, by controlling the flow of fluid pressure to the cylinder 47 or from the cylinder 71. A construction of this kind is applied to pipe 45—45' and is indicated by the valves 46—46' which are connected by the rod 101 for simultaneous movement and are controlled by rod 102 which has a collar 103 engaging spring 104 bearing against the stop 105. The rod 102 is provided with an armature 106 which is moved against spring 104 by the magnet 107, controlled by the circuit 108 and switch 109. The connections to the stem of valves 46, 46' operated by 102 are so arranged that movement by the spring 104 normally holds the valve 46—46' open, but when the switch 109 is closed to energize magnet 107, the valve stems are rotated in a direction to seat at 110 and the fluid pressure from the cylinder 47 is thereby prevented from returning to cylinder 44, thus the pressure in cylinder 47 is maintained. A form of valve that may be used at 46 is indicated in Fig. 6, in which the valve member 110 is opened or closed, depending upon the rotation of the stem 46 corresponding with the diagram in Fig. 5. In order that the brakes may be released if power is applied to the motors when the valve 46 is closed, a by-pass is provided, as indicated, by the ball valve 111 below the valve 46 which, through passages 112 and 113 forms a by-pass around the valve 110 in the direction to permit fluid pressure to flow from cylinder 44 to cylinder 47, but prevents the flow of fluid pressure in the opposite direction. This construction enables the brakes to be fully released on a truck that is standing still and thereby maintained in the released position under the control of the operator. Also, it insures that when power is applied to the motors, brakes are automatically released even if the operator should neglect to open the switch 109.

The control of the motors is not shown in this application, but may be arranged in accordance with my co-pending application, Serial No. 189,717, filed May 7, 1927, also the control of the planetary member may be arranged in accordance with my co-pending application, Serial No. 458,736, filed May 31, 1930.

It should be understood that the drawings are largely diagrammatic in form and that the application of the brakes and the levers controlling the brakes may be arranged to operate mechanically, pneumatically or by hydraulic pressure according to conditions best suited to the particular application desired, of which the drawings may be taken as a typical representation and in any specific embodiment.

This invention includes the closed circuit principle in a number of its features; for instance, if pressure cannot be established in cylinders 47, 47' the brakes will not be released, or if released, they will be applied when this pressure reduces below normal, such as might be caused by a leak in pipe 45. If the brake magnet 90 fails to hold the cam 42, the back pressure on piston 48 will tend to move this cam to the braking position, which is a condition of safety. If the connections to cylinder 69 should leak and reduce the pressure, the detector 84, 85 would be operated to stop the motors.

The brakes are controlled manually by the control of the motors 27, 27'. When the motors are deenergized, the planetary members of the differential mechanisms are brought into the braking position by the continued movement of the truck. The brakes are further controlled manually by magnets 90, 90' controlling the movement of the braking cam, also by magnet 107 and switch 109 which enables the brakes to be held released when the motors are stopped.

The automatic control of the brakes through the driving motor is described in U. S. Patent 1,805,551, and the manual control of the brakes through the driving motor and through magnets 90, 90' for locking the cam is described in co-pending application Serial No. 458,736, filed May 31, 1930, above referred to.

In operation it will be noted that the fluid pressure for controlling the brakes is controlled by the cam member 42 associated with the planetary member of the differential mechanism. This member is automatically moved from an application position to a released position by the starting and acceleration of the vehicle and it is automatically moved from the released position towards the braking position by the retardation of the vehicle caused by the slowing down of the driving motor. The cam produces a graduated braking action and a graduated brake release in accordance with its shape. The pressure in the control pipe 45 acting on piston 48 tends to move the cam 42 until its lowest side engages 43, that is, this pressure provides a bias tending to move member 42 normally to the braking position, from a position of rest relative to 43 which it assumes in the released position. The cam 42 is moved towards the braking position corresponding with the speed of the vehicle and with the deceleration of the armature of the driving motor.

The movement of cam 42 is manually controlled by magnets 90, 99' and the pressure fluid for controlling the brakes is also manually controlled by magnet 107 and the remotely located switch 109. The brake controlling power is supplied from two independent sources through pipes 45, 45' and these sources are co-operatively controlled by magnet 107. The cam 42 controls the character of the braking independently of the manual control.

Having thus described my invention, I claim:

1. A braking system for a railway truck comprising a pair of propulsion motors mounted on said truck, a lost motion device connecting each motor with the running wheels of said truck, and a mechanism associated with each lost motion device cooperating to raise the load on said truck and to equalize the power for raising said load between said motors.

2. A braking system for a railway truck comprising a pair of propulsion motors mounted on said truck, a lost motion device connecting each motor with the running wheels of said truck, and a mechanism cooperating with each lost motion device to equalize and store energy by the initial movement of said motors for operating the brakes of the truck.

3. A braking system for a railway truck comprising a pair of propulsion motors mounted on said truck, a differential mechanism having a planetary member connecting each motor with the running wheels of said truck and a mechanism operated by said planetary members for equalizing and storing energy for operating the brakes of said truck by the initial movement of said motors.

4. A braking system for a railway truck comprising a pair of propulsion motors mounted on said truck, a differential mechanism having a planetary member connecting each motor with the running wheels of said truck and a fluid pressure mechanism operated by said planetary members for storing energy for operating the brakes of said truck.

5. A braking system for a railway truck comprising a propulsion motor, a differential mechanism having a planetary member connecting said motor with the running wheels of said truck and a fluid pressure mechanism operated by said planetary member and operatively connected with the braking system of said truck.

6. In a braking system, the combination, a driving mechanism, a driven mechanism, a differential mechanism having a planetary member connecting said driving and said driven mechanisms, a brake for said driven mechanism and a fluid pressure mechanism operating said brake and operated by said planetary member.

7. In a braking system, the combination, a driving mechanism, a driven mechanism, a differential mechanism having a planetary member connecting said driving and said driven mechanisms, a brake for said driven mechanism, a cylinder with a piston operated by said planetary member, a second cylinder with a piston operatively connected with said braking system and a pressure fluid connection between said cylinders.

8. In a braking system, the combination, a plurality of driving members, a driven member, a differential mechanism having a planetary member connecting each of said driving members with said driven member, a braking mechanism for said driven member and a fluid pressure mechanism operated by said planetary members and operatively connected with said braking system.

9. In a braking system, the combination, a plurality of driving members, a driven member, means operatively connecting each of said driving members with said driven member through a lost motion connection, a braking mechanism for said driven member and equalized means controlling said braking mechanism by said connecting means.

10. In a braking system, the combination, a driving member, a driven member, a differential mechanism having a planetary member operatively connecting said driving and driven members a braking mechanism for said driven member operatively connected with said planetary member and operated to apply the brakes as said driving member ceases to drive said driven member and manually operated means for restricting said braking action.

11. In a braking system, the combination, a driving member, a driven member, a differential mechanism having a planetary member operatively connecting said driving and driven members, a braking mechanism for said driven member operatively connected with said planetary member and yielding means for locking said planetary member against movement.

12. In a braking system, the combination, a driving member, a driven member, a differential mechanism having a planetary member operatively connecting said driving and driven members a braking mechanism for said driven member operatively connected with said planetary member and remotely controlled means for braking said planetary member in any position.

13. In a braking system, the combination, a driving member, a driven member, a differential mechanism having a planetary member operatively connecting said driving and driven members, a braking mechanism for said driven member operatively connected with said planetary member and electrically controlled means for braking said planetary member in any position.

14. In a braking system, the combination, a driving mechanism, a driven mechanism, a differential mechanism having a planetary member connecting said driving and said driven mechanisms, a brake for said driven mechanism and a fluid pressure mechanism operating said brake and operated by said planetary member and means for detecting the presence of said fluid pressure in the system.

15. In a braking system, the combination, a driving mechanism, a driven mechanism, a differential mechanism having a planetary member connecting said driving and said driven mechanisms, a brake for said driven mechanism, a cylinder with a piston operated by said planetary member, a second cylinder with a piston, a fluid pressure medium connecting said cylinders, a weight supported by the piston of said second cylinder and means operatively connecting said brake with said weight.

16. In a braking system, the combination, a driving mechanism, a driven mechanism, a differential mechanism having a planetary member connecting said driving and said driven mechanisms, a brake for said driven mechanism, a cylinder with a piston operated by said planetary member, a second cylinder with a piston, a fluid pressure medium connecting said cylinders, a weight supported by the piston of said second cylinder and fluid pressure means operatively connecting said brake with said weight.

17. In a braking system, the combination, a pair of driving motors, a driven mechanism, a differential mechanism with a planetary member operatively connecting said motors with said driven mechanism, a brake for said driven mechanism, a cylinder with a piston operated by each of said planetary members, a pair of cylinders having pistons connected by fluid pressure means with said first mentioned cylinders, a weight supported by the pistons of said pair of cylinders and means operatively connecting said brake with said weight.

18. In a braking system, the combination, a pair of driving motors, a driven mechanism, a differential mechanism with a planetary member operatively connecting said motors with said driven mechanism, a brake for said driven mechanism, a cylinder with a piston operated by each of said planetary members, a pair of cylinders having pistons connected by fluid pressure means with said first mentioned cylinders, equalizing means connecting said cylinders, a weight supported by the pistons of said pair of cylinders and means operatively connecting said brake with said weight.

19. A braking system for a railway truck comprising a spring mounted frame, a propulsion motor, a differential mechanism having a planetary member, a counter shaft on said frame, said planetary member mounted on said counter shaft, radius rods connecting the running wheels of said truck with said counter shaft, said motor connected to one member of said differential mechanism, the opposite member of said differential mechanism connected to the running wheels of said truck and a braking mechanism for said truck operatively connected with said planetary member.

20. In a braking system, the combination, a driving mechanism comprising a motor, a driven mechanism, means operatively connecting said mechanisms, a brake for said driven mechanism, controlled by said connecting means, a fluid pressure mechanism operating said brake and means for preventing the operation of said motor when the fluid pressure in said braking system is below a predetermined value.

21. In a braking system, the combination, a driving mechanism comprising a motor, a driven mechanism, means operatively connecting said mechanisms, a brake for said driven mechanism, controlled by said connecting means, a fluid pressure mechanism operating said brake, a circuit controlling said motor, and means operated by the pressure in said braking system controlling said circuit.

22. In a braking system, the combination, a driving mechanism comprising a motor, a driven mechanism, means operatively connecting said mechanisms, a brake for said driven mechanism controlled by said connecting means, a fluid pressure mechanism operating said brake, a circuit controlling said motor, a cylinder connected with said fluid pressure braking system and a piston operating in said cylinder and controlling said circuit.

23. In a braking system, the combination, a driving mechanism comprising a motor, a driven mechanism, means operatively connecting said mechanisms, a brake for said driven mechanism controlled by said connecting means, a fluid pressure mechanism operating said brake, a circuit controlling said motor, a cylinder connected with said fluid pressure braking system, a piston operating in said cylinder in response to said fluid pressure and a circuit controller connected with said piston and arranged to close the circuit of said motor only when a predetermined pressure is maintained on said piston.

24. In a braking system, the combination, a driving mechanism comprising a motor, a driven mechanism, means operatively connecting said mechanisms, a brake for said driven mechanism, controlled by said connecting means, a fluid pressure mechanism operating said brake, a circuit controlling said motor, means for supplying pressure to said fluid pressure mechanism by said motor and means operated by said fluid pressure for controlling said circuit.

25. In a braking system, the combination, a driving mechanism, a driven mechanism, means operatively connecting said mechanisms, a stored source of fluid pressure, a braking system for said driven mechanism operated by said fluid pressure and controlled by said connecting means, and means connected with said fluid pressure for stopping said driving mechanism when said fluid pressure falls below a predetermined value.

26. In a braking system, the combination, a driving mechanism, a driven mechanism, means operatively connecting said mechanisms, a fluid operated braking system for said driven mechanism controlled by said connecting means, a spring holding the brakes normally released against said pressure and means connected with said fluid pressure for stopping said driving mechanism when said fluid pressure falls below a predetermined value.

27. A braking system for a vehicle having a bolster, comprising fluid pressure operated means engaging said bolster, a braking mechanism for said vehicle and a fluid pressure system operatively connecting said braking mechanism with said means.

28. A braking system for a vehicle having a bolster, a cylinder having a piston engaging said bolster, a braking mechanism for said vehicle having a cylinder with a piston for operating the brakes and fluid pressure means connecting said cylinders whereby said braking mechanism is operated by the movement of said bolster.

29. A braking system for a vehicle having a bolster, a cylinder having a piston engaging said bolster, a braking mechanism for said vehicle, fluid pressure means connecting said cylinder with said braking mechanism and fluid pressure means controlling the movement of said bolster.

30. A braking system for a vehicle having a spring mounted bolster, a pair of cylinders having pistons engaging said bolster, a braking mechanism for said vehicle having a cylinder for operating the brakes and equalized fluid pressure means connecting said pair of cylinders with said braking cylinder.

31. In a braking system, the combination, a driving mechanism, a driven mechanism means operatively connecting said mechanisms, a brake for said driven mechanism controlled by said connecting means, a fluid pressure mechanism operating said brake, means for supplying pressure to said fluid pressure mechanism by said driving mechanism and a valve in said fluid pressure mechanism for controlling the brake operation.

32. In a braking system, the combination, a driving mechanism, a driven mechanism, a brake for said driven mechanism, a fluid pressure mechanism operating said brake, means for supplying pressure to said fluid pressure mechanism by said driving mechanism for releasing the brakes and a by-pass valve in said fluid pressure mechanism by-passing the fluid pressure for releasing the brakes.

33. A braking system comprising a driving and a driven mechanism, a brake for said driven mechanism, a fluid pressure mechanism operating said brake, means for automatically supplying pressure to said fluid pressure mechanism and a valve for permitting the flow of pressure fluid to said mechanism in one direction only and preventing the application of the brakes.

34. A braking system comprising a driving and a driven mechanism, a brake for said driven mechanism, a fluid pressure mechanism operating said brake, means for automatically supplying pressure to said fluid pressure mechanism and a valve biased to the open position and having a by-pass in one direction controlling the flow of said fluid pressure.

35. A braking system comprising a driving mechanism and a driven mechanism, a differential mechanism having a planetary member connecting said driving and driven mechanisms, a braking mechanism for said driven mechanism, means for operating said braking mechanism to apply the brakes by said planetary member in one position and for operating said braking mechanism to release the brakes by said planetary member in another position and independent means for holding the brakes released when said planetary member moves to the latter position.

36. A braking system comprising a driving mechanism and a driven mechanism, a differential mechanism having a planetary member connecting said driving and driven mechanisms, a braking mechanism for said driven mechanism controlled by the movement of said planetary member, means for releasing the brakes by the movement of said planetary member in one direction and means for holding the brakes released after the planetary member moves away from said position.

37. In a braking system for a vehicle having a bolster, a braking mechanism for said vehicle operatively connected with said bolster and fluid pressure means connected with said bolster for varying the operation of said braking mechanism.

38. A braking system for a vehicle having a bolster, a load centered on said bolster, a braking system operatively connected with said bolster and a plurality of means operated by fluid pressure engaging said bolster and spaced from the centre of said bolster for varying the operation of said braking system.

39. A braking system for a vehicle having a bolster, a load centered on said bolster, a braking mechanism operatively connected with said bolster, a fluid pressure cylinder on each side of said centre, a piston in each cylinder engaging said bolster and means controlling the fluid pressure to said cylinders.

40. A braking system for a vehicle having a bolster, a load centered on said bolster, a fluid pressure cylinder on each side of said centre, each having a piston engaging said bolster, a braking mechanism for said vehicle, a cylinder for operating said braking mechanism, and fluid pressure means operated by said bolster and connected with said brake operating cylinder.

41. A braking system comprising a driving mechanism and a driven mechanism, means operatively connecting said mechanisms, a fluid pressure brake for said driven mechanism, means for automatically storing energy by said driving mechanism before starting said driven mechanism for operating said brake and manually operated means for controlling said brake.

42. A braking system comprising a plurality of independent driving motors, a driven mechanism operatively connected with said driving motors, a brake for said driven mechanism and means cooperatively operated by said driving motors for storing energy for operating said brake.

43. A braking system comprising a plurality of independent driving motors, a driven mechanism operatively connected with said driving motors and having a load associated therewith, a brake for said driven mechanism, means cooperatively operated by said motors for raising said load, means for operating said brake by said load and manually operated means for controlling said brake.

44. A braking system for a vehicle comprising a plurality of independent driving motors operatively connected with the running gear of the vehicle, a brake for said running gear, means cooperatively operated by said motors for raising the load on said vehicle, means for operating said brake by said load and manually operated means for controlling said brake.

45. A braking system for a vehicle comprising a plurality of independent driving motors operatively connected with the running gear of the vehicle, a brake for the running gear and means cooperatively operated by said motors before starting said running gear for operating said brake when stopping.

46. A fluid pressure braking system for a railway vehicle comprising a fluid pressure control system and a fluid pressure application system controlled by said control system, a motor for propelling said vehicle and means preventing the propelling operation of said motor when the pressure in both of said pressure fluid systems falls substantially below normal.

47. A fluid pressure braking system for a railway vehicle comprising a fluid pressure control system and a fluid pressure application system controlled by said control system, a motor for propelling said vehicle, a circuit for said motor and means for interrupting said circuit when the pressure in both of said pressure fluid systems falls substantially below normal.

48. A braking system for a railway vehicle comprising brake shoes, a cylinder operatively connected with said brake shoes, a source of fluid pressure for said cylinder, means controlling the fluid pressure to and from said cylinder for applying and releasing the brakes and a moving member moved to a position substantially of rest relative to the vehicle as the vehicle is running and automatically moved from the position of rest to control said controlling means with a graduated effect as the brakes are applied.

49. A braking system for a railway vehicle comprising brake shoes, a cylinder operatively connected with said brake shoes, a source of fluid pressure for said cylinder, means controlling said fluid pressure to and from said cylinder for applying and releasing the brakes, a member movable independently of the movement of the vehicle and having a position substantially of rest relative to the vehicle when the vehicle is running normally and said member moving automatically from its position of rest to control said means and thereby modify the brake application.

50. A braking system for a railway vehicle comprising brake shoes, a cylinder operatively connected with said brake shoes, a source of fluid pressure for said cylinder, means controlling said fluid pressure to and from said cylinder for applying and releasing the brakes, a member moving automatically from a starting position as the vehicle is started towards a position substantially of rest relative to the vehicle as the vehicle is running normally and automatically moved towards the starting position as the brakes are applied, said member controlling said controlling means to vary the extent of the brake application.

51. A braking system for a railway vehicle comprising brake shoes, a cylinder operatively connected with said brake shoes, a source of fluid pressure for said cylinder, means controlling said fluid pressure to and from said cylinder for applying and releasing the brakes, a member movable independently of the movement of the vehicle and having a position substantially of rest relative to the vehicle when the vehicle is running normally, said member moving from its position of rest to control said means as the brakes are applied to vary the braking action and manually operated means for controlling the movement of said member.

52. A braking system for a railway vehicle comprising brake shoes, a cylinder operatively connected with said brake shoes, a source of fluid pressure for said cylinder, fluid pressure means controlling the fluid pressure to and from said cylinder for applying and releasing the brakes, a member movable independently of the movement of the vehicle and having a position substantially of rest relative to the vehicle when the vehicle is running normally, said member moving automatically from its position of rest to control said fluid pressure means as the brakes are applied to vary the braking action.

53. A braking system for a railway vehicle comprising brake shoes, a cylinder operatively connected with said brake shoes, a source of fluid pressure for said cylinder, means controlling said fluid pressure to and from said cylinder for applying and releasing the brakes, a member having a position substantially of rest, relative to the vehicle when the vehicle is running normally and movable to a position to control said controlling means as the brakes are applied to vary the brake application, said member being biased to move towards the braking position.

54. A braking system for a railway vehicle comprising brake shoes, a cylinder operatively connected with said brake shoes, a source of fluid pressure for said cylinder, a member having a free movement independently of the movement of the vehicle, said member being brought into operation by moving from a position substantially of rest relative to the vehicle, as the brakes are applied, said member, by its movement, automatically controlling the fluid pressure to said cylinder to vary the brake application.

55. A braking system for a railway vehicle comprising brake shoes, a cylinder operatively connected with said brake shoes, a source of fluid pressure for said cylinder, manually operated means controlling said source of fluid pressure, a member having a free movement independent of the movement of the vehicle, said member being brought into operation by a graduated movement from a position of rest relative to the vehicle, as the brakes are applied, said member, by its movement, automatically controlling the fluid pressure to said cylinder in accordance with its movement.

56. A braking system for a railway vehicle comprising brake shoes, a cylinder operatively connected with said brake shoes, a source of fluid pressure for said cylinder, manually operated means controlling said source of fluid pressure, a member having a position substantially of rest relative to the vehicle when the vehicle is running normally and being movable from said position of rest in accordance with the speed of the vehicle to control the fluid pressure for causing a progressive brake application by the movement of said member.

MATTHEW H. LOUGHRIDGE.